United States Patent [19]
Hollis et al.

[11] 3,971,895
[45] July 27, 1976

[54] TELEPHONE CONFERENCE ARRANGEMENT

[75] Inventors: John Edward Hollis, High Wycombe; John Albert Barrett, Holyport, both of England

[73] Assignee: Plessey Handel und Investments AG, Zug, Switzerland

[22] Filed: Apr. 3, 1975

[21] Appl. No.: 564,814

[30] Foreign Application Priority Data
Apr. 5, 1974 Great Britain.................15539

[52] U.S. Cl.........................179/1 CN; 179/18 BC
[51] Int. Cl.²......................................H04M 3/56
[58] Field of Search..................179/1 CN, 18 BC

[56] References Cited
UNITED STATES PATENTS

| | | | |
|---|---|---|---|
| 2,912,503 | 11/1959 | Grandstaff et al. | 179/1 CN |
| 3,050,584 | 8/1962 | Miller | 179/1 CN |
| 3,882,276 | 5/1975 | Feiner et al. | 179/1 CN |

Primary Examiner—William C. Cooper
Attorney, Agent, or Firm—Fleit & Jacobson

[57] ABSTRACT

A telephone conference circuit having a plurality of 2-wire access-paths available for connection to individual telephones of participants of a conference connection, characterized in that it has similar circuit section for each of said access-path and each circuit section comprises (a) a hybrid transformer arranged to be substantially balanced when the appropriate access-path is occupied and so connected to it or not, and (b) a buffer amplifier connected in the receive channel of the 4-wire side of the associated hybrid transformer and in which the transmit channel of the 4-wire side of the hybrid transformers of all said circuit sections are connected to the input path of a mixing amplifier which during a conference call supplies a composite signal to an input of each said buffer amplifier, each buffer amplifier having a second input path to which a signal derived from the transmit channel of the associated hybrid transformer is applied.

5 Claims, 1 Drawing Figure

U.S. Patent July 27, 1976 3,971,895
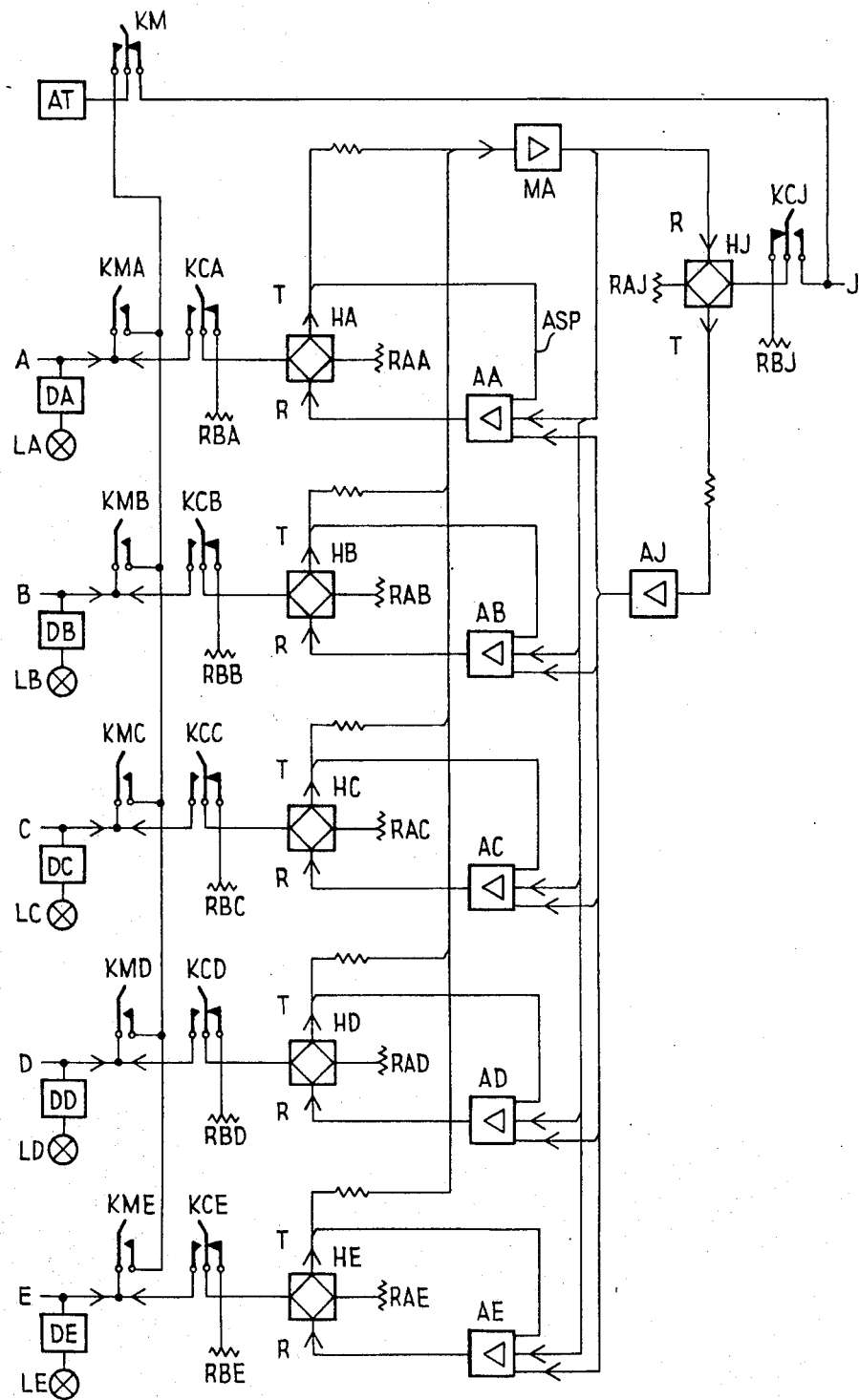

TELEPHONE CONFERENCE ARRANGEMENT

The present invention relates to conference circuits for use in telephone systems.

In a highly organized industrial society a demand is generated for the provision of conference facilities in public and private telephone systems. Such facilities are intended to enable subscribers' telephone instruments, which are each otherwise generally available for use in connections merely comprising a calling and called subscriber, to be arbitrarily interconnected to involve say up to ten parties in a conference connection. The mode of setting-up conference calls will depend on the nature of the exchange switching equipment involved and the availability or otherwise of assistance operators or attendants.

However it is evident that, in any appropriate manner, the speech paths, emanating from the individual 2-wire lines of subscribers who are to participate in a conference, are duly terminated on access-paths of a conference circuit which facilitates inter-coupling of speech signals between those paths.

It is contended that certain conference circuits employed hitherto may have suffered from relatively poor transmission performance.

The object of the invention is to provide a conference circuit providing good transmission characteristics in a simple and efficient manner.

According to one aspect of the present invention there is provided a telephone conference circuit having a plurality of 2-wire access-paths available for connection to individual telephones of participants of a conference connection, characterized in that it has similar circuit section for each of said access-path and each circuit section comprises (a) a hybrid transformer arranged to be substantially balanced when the appropriate access-path is occupied and so connected to it or not, and (b) a buffer amplifier connected in the receive channel of the 4-wire side of the associated hybrid transformer, and in which the transmit channel of the 4-wire side of the hybrid transformers of all said circuit sections are connected to the input path of a mixing amplifier which during a conference call supplies a composite signal to an input of each said buffer amplifier; each said buffer amplifier having a second input path to which a signal derived from the transmit channel of the associated hybrid transformer is applied.

The above and other aspects of the invention will be understood from the following description of methods of carrying it into effect which should be read in conjunction with the accompanying drawing which represents, in outline form, the conference circuit arrangements for use in conjunction with a P.A.X. (private automatic exchange) although it might well be a private automatic branch exchange.

The circuit is typically equipped for the entering of up to five local (P.A.X.) subscribers into a telephone conference and, if need be, for participation of a more remote subscriber; the latter being for instance a party served by public exchange connected to the P.A.X. over a tie-line. The circuit is administered from an attendant's telephone AT and indeed may be incorporated in a small console associated with that telephone.

Initially it is convenient to consider the circuit merely as though it provided the conference facility in respect of local (P.A.X.) subscribers. The five two-wire access paths A, B, C, D and E are concerned with this facility. Each access path has an identical section of the conference circuit associated with it. Thus the section related to path A, incorporates a ringing-current detector DA and signalling lamp LA, a hybrid transformer HA with balance resistors RAA and RBA relevant thereto, an amplifier AA and two keys KMA and KCA. Corresponding components are included in the circuit sections associated with paths B, C, D and E and are recognized by the corresponding suffix character "B", "C", "D", or "E" in the reference captions. The paths A, B, C, D and E extend from exclusively allocated line circuits of the P.A.X. and accordingly they are individually accessible from all subscribers of the exchange by the dialing of predetermined numbers. It may be taken that paths A, B, C, D and E are given numbers "102", "608", "706", "804", and "900" respectively. Moreover the access-paths are individually available to the attendant's telephone for the purpose of making calls to any of the P.A. X. subscribers or services.

The hybrid transformers HA, HB, HC, HD and HE have the "transmit" and "receive" pairs of their 4-wire sides designated T and R respectively, and the line-balance side of each transformer is terminated on an appropriate one of resistors RAA, RAB, RAC, RAD, and RAE. When an access-path is not in use on a conference call, the relevant one of the keys, such as KCA is unoperated so that a state of balance of the particular hybrid transformer is ensured by connection of the appropriate one of resistors RBA, RBB, RBC, RBD and RBE to the line side of the transformer. On the other hand, when an access-path is duly involved in conference call, the state of balance is preserved in known manner by the impedance of the path itself in relation to the terminating resistor at the opposite side of the hybrid.

The transmit paths, T, of the five hybrid transformers HA to HE extend over individual output resistors to a common input path of a mixing amplifier MA. This amplifier has its output connected to an individual input path of each of the summing amplifiers AA, AB, AC, AD and AE (one per circuit section). These amplifiers serve the receive paths of hybrid transformers HA to HE respectively and each provided with second input path which is derived directly from the transmit path of the hybrid transformer of the particular section.

The previously-mentioned ringing-current detectors DA, DB, DC, DD and DE connected to the 2-wire access-paths A, B, C, D and E are individually effective in lighting a switchboard-type lamp LA, LB, LC, LD or LE when ringing-current is received.

A P.A.X. subscriber wishing to have a conference call set-up, dials the number appropriate to one of the conference circuit access-paths. Assuming that he dials "102", the exchange switching equipment establishes connection to path A and advances ringing-current to it. Lamp LA is therefore lit, and the attendant responds by operating the common key KM and key KMA which is individual to the called access-path. The attendant then lifts the telephone handset and this, in known manner, trips the ringing and enables the attendant to converse with the caller. The caller passes his conference call requirements, involving up to four local (P.A.X.) subscribers, to the attendant who then causes a holding condition (not shown) to be applied to the called access-path A. The attendant also releases key KMA and operates one of the other corresponding keys to connect the telephone AT to another access-path. Assuming that key KMB is operated, connection is established to path B, and the operator then dials the P.A.X. telephone number of the first of the required conference parties. When this party duly answers, he is requested to hold the line pending completion of the conference situation. As before a holding condition is applied to path B, and the attendant releases key KMB. The attendant then connects with say access-path C by operating key KMC and then proceeds to call a second required conference party following the procedure already outlined. Accordingly the last mentioned party, like the other two is duly subjected to a holding condition, and the attendant may go on to call other required conference subscribers, in the same manner, over access-paths D and E successively.

When connections have been established to all the required conference subscribers, they are advised by a verbal announcement or tone signal of the impending completion of the conference situation. The attendant then enables the conference to proceed by operating key KCA, KCB, KCC, KCD and KCE to connect each two-wire access-path to an appropriate hybrid.

Variations in the attendant's operating procedures can be accommodated by suitable modifications to the circuit. For instance the holding of the original call, incoming over typically path A, may be effected by operation of key KCA immediately after he has passed his requirements to the attendant; the hybrid transformer then providing the holding condition. Again when an outgoing call has been established to the first required conference party over path B, key KCB is operated to establish a conversational connection between said party and the originating subscriber. Calls to additional required parties are set-up on a one-at-a-time basis and immediately such a call has been set up the particular party is added to the existing conversational connection by operation of the appropriate one of keys KCC, KCD, and KCE. Means may be provided to inject a pulse of warning-tone into the existing conversational connection immediately prior to introduction of a further party.

In any event the ultimate situation is that as many local subscribers as are required to participate in the conference are connected to individual ones of access-paths A to E, and for each path so employed the appropriate ones of keys KCA to KCE is operated to complete extension to the relevant hybrid transformer.

Speech signals, forthcoming over each occupied access-path, are reproduced in the transmit channel T of the relevant hybrid and extended over an individual resistor to the common input path of the mixing amplifier MA. The composite output signal therefore derived from the latter is extended to the summing amplifiers AA to AE serving the receive path R of hybrids HA to HE respectively.

It is to be noted that the transmit channel T of each hybrid transfer is directly connected over a path such as ASP to a second input of the related receive path amplifier. This enables part of any speech signal forthcoming at the individual transmit path of a hybrid transformer to be injected into the relevant receiver amplifier in anti-phase to the relevant component of the composite signal obtained from the mixing amplifier MA. The latter conveniently provides the necessary phase-inversion.

As regards access-path A, the anti-phase signal applied to receive amplifier AA virtually disables the amplifier in respect of any prevailing portion of the content of the composite input signal which is appropriate to the speech signal incoming over path A. Anti-phase signals are used in like manner in respect of each occupied access-path and accordingly undesirable feed-back into them is avoided or reduced.

Although five access-paths A to E are shown, the number could be readily increased to ten by the inclusion of five more identical sections to the conference circuit. However in addition to the paths which are served by the local P.A.X., an additional 2-wire access path J is provided. This is coupled by a tie-line or junction to a more remote P.A.X. or to a public exchange and may be used in respect of calls incoming from or outgoing to the remote exchange. It is assumed that the level of speech transmission duly forthcoming over path J will be at a considerably lower level than that appertaining to local subscribers since the various connections to a subscriber using path J will be subject to relatively high attenuation.

Access-path J has hybrid transformer HJ associated with it, and in the quiescent state this is balanced by resistors RAJ and RBJ; the state of balance being preserved when the access-path is duly connected to the hybrid by operation of key KCJ. The transmit channel T at the four-wire side of the hybrid is connected to the unity-gain amplifier AJ which has its output connected to a third input-path of each of the summing amplifiers AA to AE. The output of mixing amplifier MA besides extending as before-mentioned to another input of each of amplifiers AA to AE is connected to the receive channel of hybrid HJ.

A call incoming from the remote exchange or set-up by the attendant at telephone AT to a subscriber on the remote exchange may be introduced to conference by the operation of key KCJ at the appropriate time. Prior to this the path J when extended over key KM to the attendant's telephone AT is available for connection of ringing-current to the latter on an incoming call. When the attendant answers in this situation, the ringing is tripped, and the caller and the attendant can converse possibly preparatory to the latter setting-up a required conference connection.

When a conference connection, involving a remote exchange party, is eventually established, speech signals forthcoming at path J, are extended over the buffer amplifier AJ to each of amplifiers AA to AE which are also receiving composite signals from the mixing amplifier MA. Within the amplifiers AA to AE the composite signal and the signal received from amplifier AJ are brought to compatible levels to substantially compensate for the difference in transmission levels received at the local access-paths A to E and the junction or tie-line access-path J.

The invention is not limited in application to any arrangement controlled in the manner described and requiring the intervention of an operator or attendant for the setting-up of a conference call. The transmission principles involved are equally applicable to the subscriber control of conference facilities, for example in a register/marker controlled exchange, possibly with stored-program control facilities. Thus a conference circuit with typically five sections corresponding to those related to paths A to E of the drawing may be provided; each such section comprising components such as hybrid HA, balance resistors RAA and RBA, and receive path amplifier AA, inter-connected as before and likewise associated with the common mixing amplifier. Obviously in this environment no attendant's telephone instrument, keys for display lamps, are involved although relay switching means corresponding to keys KCA to KCE would be provided. Ringing detectors DA to DE would not be provided for the access-paths although one of the latter say A would be provided with special equipment.

In the exchange providing subscriber control of the setting-up of telephone conference, according to one proposed mode of providing the facility, those subscribers who are eligible to initiate conference calls do so by dialing a conference code. This, in conjunction with a class-of-service signal emanating from the subscriber's line circuit, causes the conference caller to be connected over the exchange switching network to access-path A of the or any similar conference circuit. Equipment (not shown) associated with or included in the conference circuit enables further digits dialed by the caller, and defining a first required subscriber, to be utilized in the control of the switching network to cause that required subscriber to be connected to another access-path (say B) of the conference circuit. A conversational connection is established, over the conference circuit, between the caller and first required subscriber and after the last-mentioned subscriber has been warned of the impending conference and placed in a holding condition, the caller proceeds to dial the number of the next required subscriber. The procedure may be repeated for possibly two other subscribers.

Ultimately as many subscribers as are required to participate in the conference are connected to individual access-paths of the circuit and for each employed path the relevant relay contacts of those corresponding to KCA to KCE are operated to complete the line connections to the particular hybrid transformers, whereupon the telephone conference is enabled to proceed.

What we claim is:

1. A telephone conference circuit having a plurality of 2-wire access-paths available for connection to individual telephones of participants of a conference situation, characterized in that it has similar circuit-section for each of said access-paths, and each circuit-section comprises (a) a hybrid transformer, a switching device and a balancing means and having said hybrid transformer substantially balanced by said balancing means in a first state of said switching device and by the access path, when occupied, in a second state of the switching device, and (b) a buffer amplifier connected in the receive channel of the 4-wire side of the associated hybrid transformer, and in which the transmit channel of the 4-wire side of the hybrid transformers of all said circuit-sections are connected to the input path of a mixing amplifier which during a conference call supplies a composite signal to an input of each said buffer amplifier; each said buffer amplifier having a second input path to which a signal derived from the transmit channel of the associated hybrid transformer is applied.

2. A telephone conference circuit as claimed in claim 1 in which said access paths terminate on corresponding line circuits of an automatic telephone exchange and each circuit-section includes an individual ringing-current detector and a visual indicator operable thereby to signify that an incoming call has been routed to the pertinent access-path over switching equipment of the exchange.

3. A telephone conference circuit as claimed in claim 2 in which an attendant's telephone is provided and each circuit section includes a second switching device which like said first-mentioned switching device is manually-controlled by the attendant, the second switching device of any circuit-section enabling the attendant's telephone to be used for answering an incoming call or for setting-up an outgoing call over the access-path of that section.

4. A telephone conference circuit as claimed in claim 1 in which an additional 2-wire access-path serving a bothway junction is incorporated and is provided with its own circuit-section comprising a hybrid transformer together with a unity-gain amplifier included in the transmit channel of the 4-wire side of the latter transformer and extending to a third input path of each said buffer amplifier, and the composite signal supplied by said mixing amplifier is additionally connected to the receive channel of the last-mentioned transformer.

5. A telephone conference circuit as claimed in claim 1 in which one of said access-paths is accessible over switching equipment of an automatic telephone exchange by any subscriber originating a conference call, and means is provided to enable some or all of the remaining access-paths to be subsequently connected to individual subscribers of the exchange according to digital information transmitted by the originating subscriber.

* * * * *